(12) United States Patent
Xiao

(10) Patent No.: US 8,547,956 B2
(45) Date of Patent: Oct. 1, 2013

(54) SELECTION SYSTEM FOR A QUALITY OF SERVICE FLOW AND SELECTION METHOD EMPLOYING THE SAME

(75) Inventor: Qiong Xiao, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 128 days.

(21) Appl. No.: 13/340,654

(22) Filed: Dec. 29, 2011

(65) Prior Publication Data
US 2012/0236754 A1  Sep. 20, 2012

(30) Foreign Application Priority Data
Mar. 14, 2011 (CN) .......................... 2011 1 0060507

(51) Int. Cl.
*H04J 3/16* (2006.01)
(52) U.S. Cl.
USPC ............ 370/346; 370/329; 370/343; 370/345
(58) Field of Classification Search
USPC ................. 370/260, 261, 265, 270, 271, 329, 370/342, 343, 344, 345, 346
See application file for complete search history.

(56) References Cited

U.S. PATENT DOCUMENTS

2009/0190568 A1* 7/2009 Son et al. ...................... 370/346
2009/0238135 A1* 9/2009 De et al. ....................... 370/329

* cited by examiner

*Primary Examiner* — Kwang B Yao
*Assistant Examiner* — Harun Chowdhury
(74) *Attorney, Agent, or Firm* — Altis & Wispro Law Group, Inc.

(57) ABSTRACT

A customer-premises equipment (CPE) communicates with an element management system (EMS) via a base station (BS) includes a signal transceiver unit and a signal processing unit. The signal transceiver unit transmits predetermined request information to the EMS. The signal processing unit determines a maximum sustained rate (MSR) of an extended real-time polling service (ERTPS) flow according to the request information. The signal processing unit determines whether or not the MSR enables support multiway calls, if the MSR cannot support multiway calls, the signal processing unit creates a quality o service (QoS) flow as an OFOC mode. If the MSR enables the multiway calls, the signal processing unit compares load values of the BS with a threshold value, and sets the QoS flow to the OFOC mode or to an OFAC mode according to the comparison.

20 Claims, 5 Drawing Sheets

SELECTION SYSTEM FOR A QUALITY OF SERVICE FLOW AND SELECTION METHOD EMPLOYING THE SAME

BACKGROUND

1. Technical field

The disclosure generally relates to computer networks, and more particularly to a selection system for a quality of service (QoS) flow and a selection method employing the same.

2. Description of the Related Art

The worldwide interoperability for microwave access (WIMAX) system can provide voice over Internet protocol (VoIP) services and may include a number of customer-premises equipment (CPE) and a base station (BS) in communication with the CPE through the Internet. The WIMAX standard uses a quality of service (QoS) control mechanism based on connections between the BS and the CPE. To supply a VoIP service, an appropriate QoS flow needs to be preset to allow the transport of traffic with VoIP requirements, such as one flow all call (OFAC) mode which signifies one type of QoS flow which can support multiple calls, or one flow one call (OFOC) mode which signifies one type of QoS flow supporting one call.

However, the preset QoS flow mode (e.g., OFOC) cannot be changed in real-time until a second QoS flow mode (OFAC) is reset to establish communication between the CPE and the BS. Thus, the WIMAX system cannot automatically adjust and select an appropriate QoS mode for the communication according to the practical application of the WIMAX system, because of a lack of compatibility.

Therefore, there is room for improvement within the art.

BRIEF DESCRIPTION OF THE DRAWINGS

Many aspects of a selection system for a quality of service flow and a selection method employing the same can be better understood with reference to the following drawings. The components in the drawings are not necessarily drawn to scale, the emphasis instead being placed upon clearly illustrating the principles of the selection system for a quality of service flow and the selection method employing the same. Moreover, in the drawings, like reference numerals designate corresponding parts throughout the several views. Wherever possible, the same reference numbers are used throughout the drawings to refer to the same or like elements of an embodiment.

DETAILED DESCRIPTION

Figure 1:
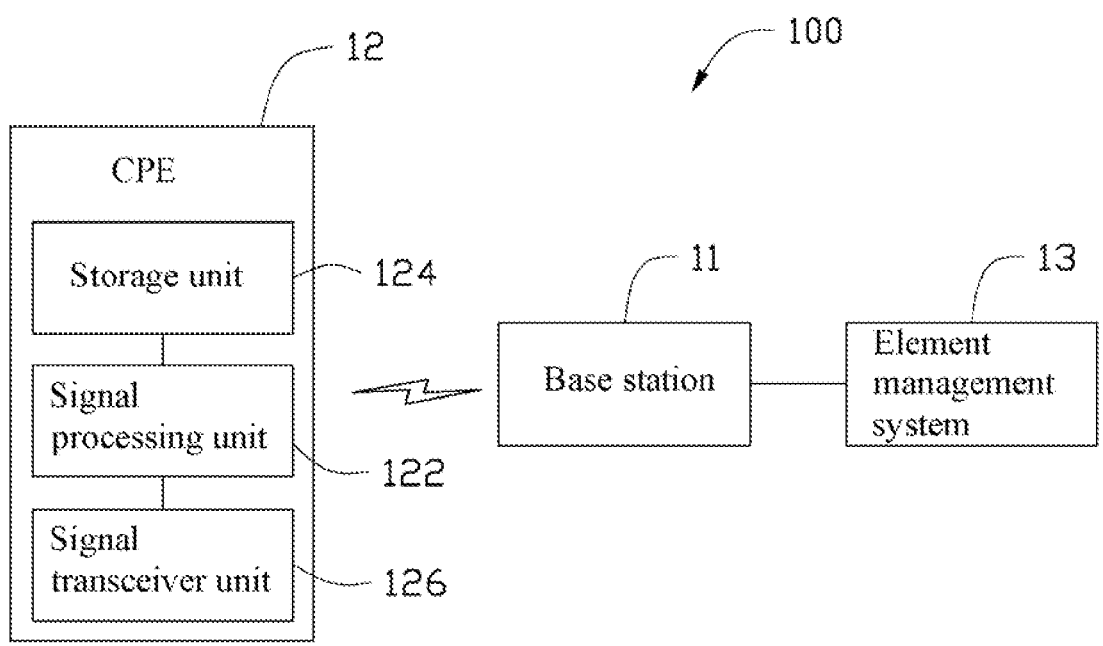
FIG. 1 is a block view of one embodiment of a selection system for a quality of service (QoS) flow, according to an embodiment of the disclosure.

FIG. 1 shows a block view of one embodiment of a selection system 100 for a quality of service (QoS) flow, according to an embodiment of the disclosure. In this embodiment, the selection system 100 can be used for worldwide interoperability for microwave access (WIMAX) system, and to automatically select an appropriate QoS flow to provide data, video and voice over Internet protocol (VoIP) services for users. The selection system 100 includes a base station (BS) 11, a plurality of customer-premises equipment (CPE) 12, and an element management system (EMS) 13.

Figure 2:
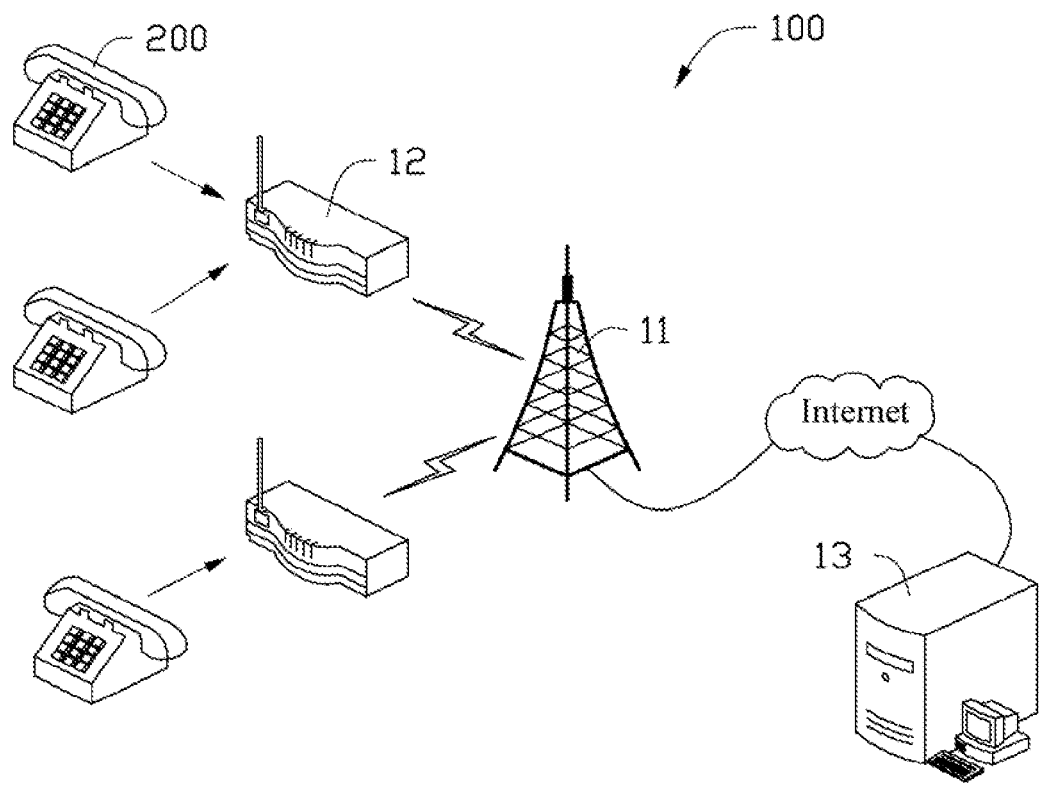
FIG. 2 is a schematic view of the selection system for a QoS flow in electronic communication with a plurality of telephones.

Referring to FIG. 2, in this embodiment, the CPE 12 are in electronic communication with the BS 11, the BS 11 is in electronic communication with the EMS 13 via the Internet, and the CPE 12 communicate with the EMS 13 via the BS 11. The BS 11 is a wireless communications station positioned at a fixed location and used for communication with the CPE 12 in the coverage range of the BS 11. The BS 11 can receive and process query information from the EMS 13, and transmit feedback results to the EMS 13.

Each of the CPE 12 can be a telephone, a router, a home networking adaptor or an Internet access gateway that enables consumers to access the services of communications service providers via a local access network, and includes a signal processing unit 122, a storage unit 124 and a signal transceiver unit 126. The signal processing unit 122 can be a central processing unit (CPU) which carries out the functions of the CPE 12. The storage unit 124 is electrically connected to the signal processing unit 122 and can be one of a programmable read-only memory, a flash memory or other memory device which can store and record program instructions and/or data. The signal transceiver unit 126 is electrically connected to the signal processing unit 122 and is capable of receiving and transmitting signals. In this embodiment, the signal processing unit 122 of the CPE 12 searches and detects current operating frequency bands (e.g., 2.3 GHz or 2.5 GHz) of the CPE 12 to obtain WIMAX channels for the BS 11, and sorts the WIMAX channels based on carrier to interference plus noise ratio (CINR) to place the WIMAX channels in order (e.g., an ascending order or a descending order), and selects an optimal WIMAX channel over which to establish communication with the BS 11 and further complete the network entry.

In this embodiment, when the CPE 12 communicate with the BS 11, the signal processing unit 122 downloads and processes a bootstrap program from the EMS 13, and exchanges authentication information with the EMS 13 via the signal transceiver unit 126. The bootstrap program is stored within the storage unit 124 and is a subroutine that is used to initiate and establish the full routine or another routine.

Each of the CPE 12 electronically communicates with at least one telephone 200. When the telephones 200 are dialing or busy, the signal transceiver unit 126 transmits preset request information to the EMS 13 through the BS 11 and the Internet to query and determine a maximum sustained rate (MSR) of an extended real-time polling service (ERTPS) flow of the corresponding BS 11. The signal processing unit 122 then calculates a corresponding maximum bandwidth for achieving communication between the CPE 12 and the BS 11.

The CPE 12 determines whether or not the MSR of the ERTPS flow enables support for multiway calls between the CPE 12 and EMS 13. If the MSR of the ERTPS flow is unable to support the multiway calls between the CPE 12 and EMS 13, the QoS flow is directly set to a one flow one call (OFOC) mode that indicates that one QoS flow supports a call to ensure each call has its QoS flow. If the MSR of the ERTPS flow enables support for multiway calls between the CPE 12 and EMS 13, the signal transceiver unit 126 resends the preset request information to the EMS 13 to obtain load values of the BS 11, and compares the obtained load values with a predetermined threshold value to select as the QoS flow the OFOC mode or a one flow all call (OFAC) mode according to the comparison. The OFAC mode signifies a QoS flow which can support multiple calls between the CPE 12 and EMS 13.

The EMS 13 includes systems and applications for managing network elements on the network element management layer. In this embodiment, the EMS 13 receives the request information from the signal transceiver unit 126 of any CPE 12 through the Internet and the BS 11, and transmits the enquiry to the BS 11. The enquiry includes the MSR of the ERTPS, and the load values of the BS 11. The BS 11 processes the enquiry from the EMS 13, and transmits the feedback results to the EMS 13. The EMS 13 processes the feedback results and transmits the feedback results to the CPE 12.

Figure 3A:
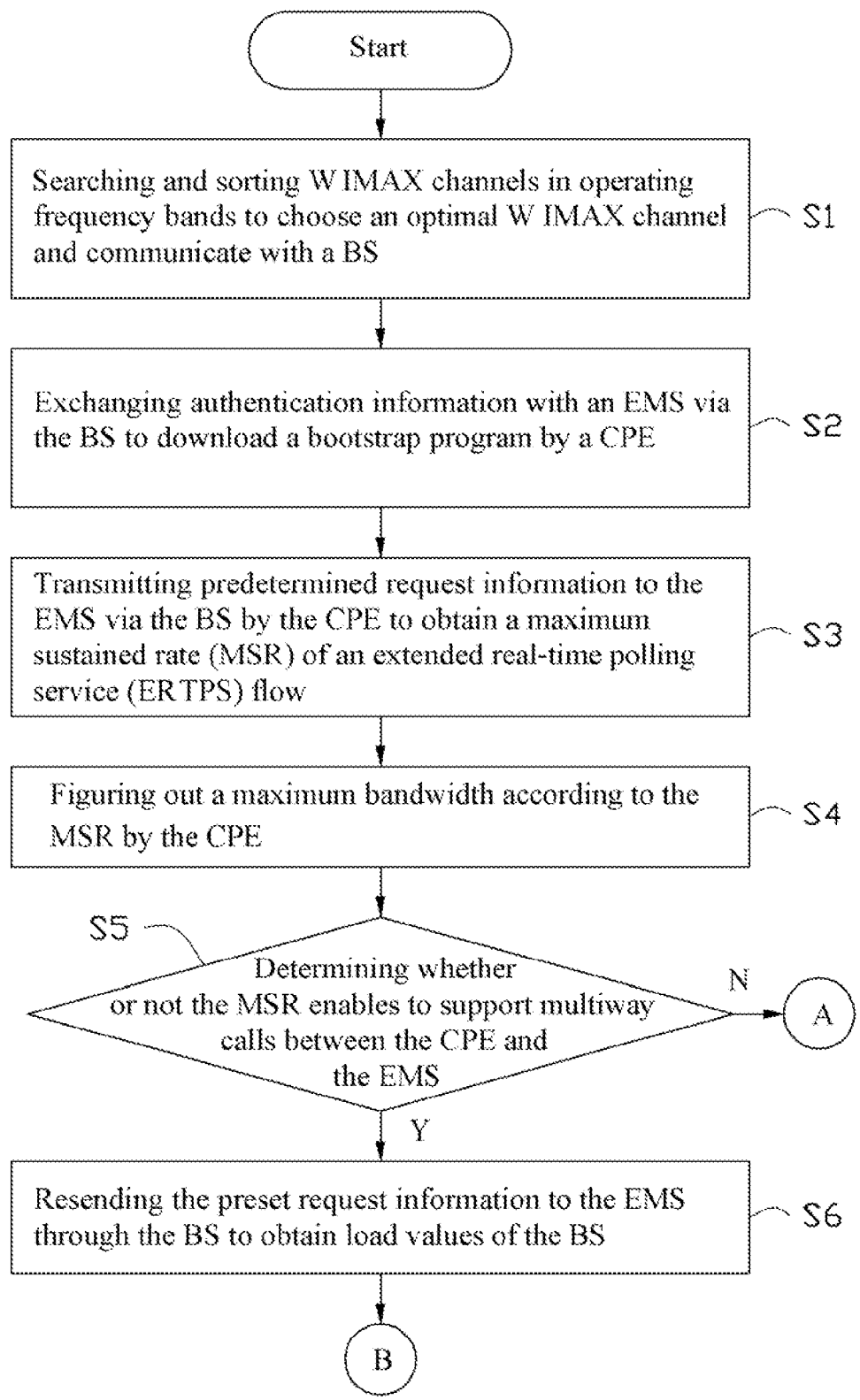
FIGS. 3A and 3B are flowcharts of a selection method including step S14, according to an embodiment of the present disclosure.
Figure 3B:
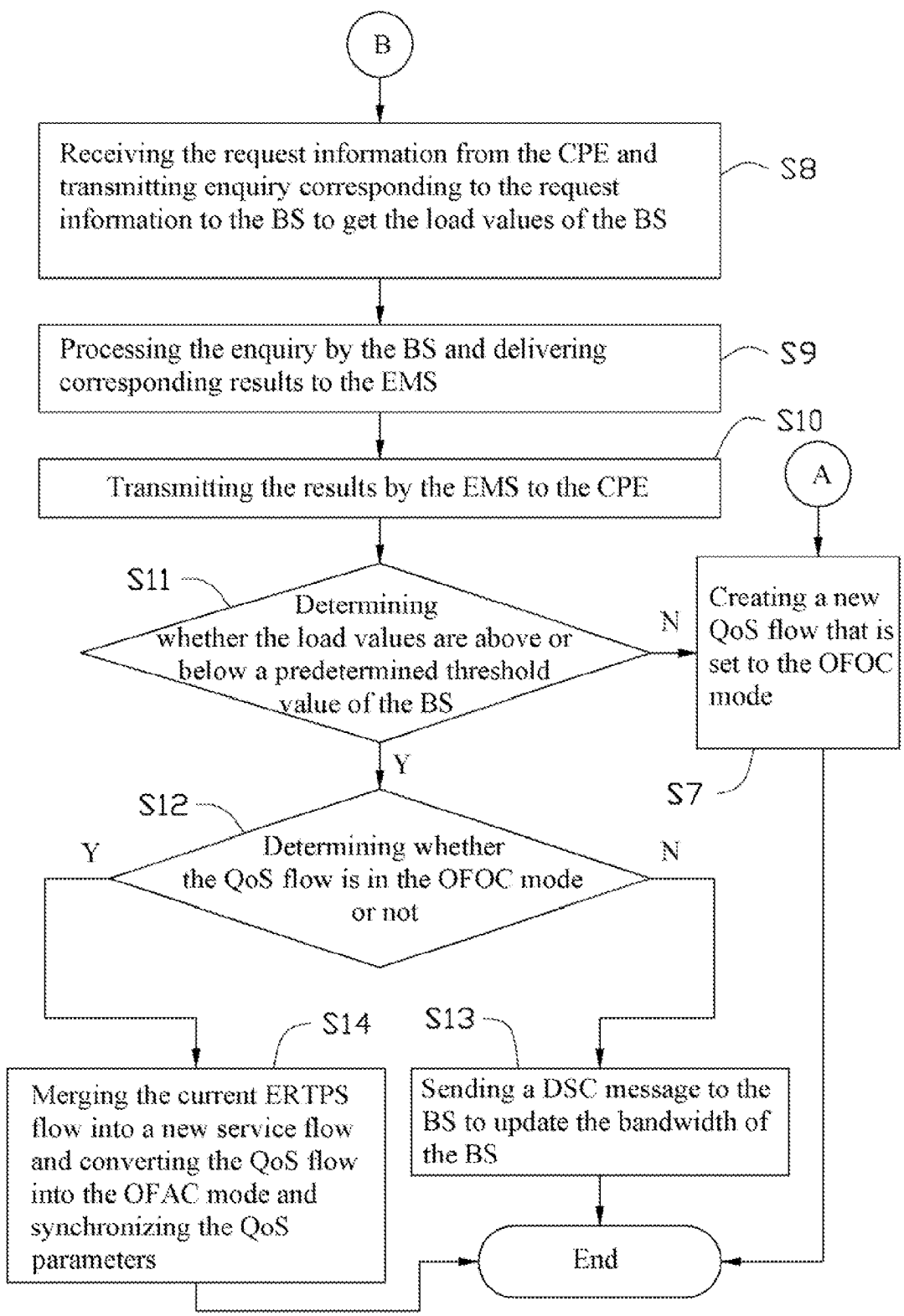
Figure 4:
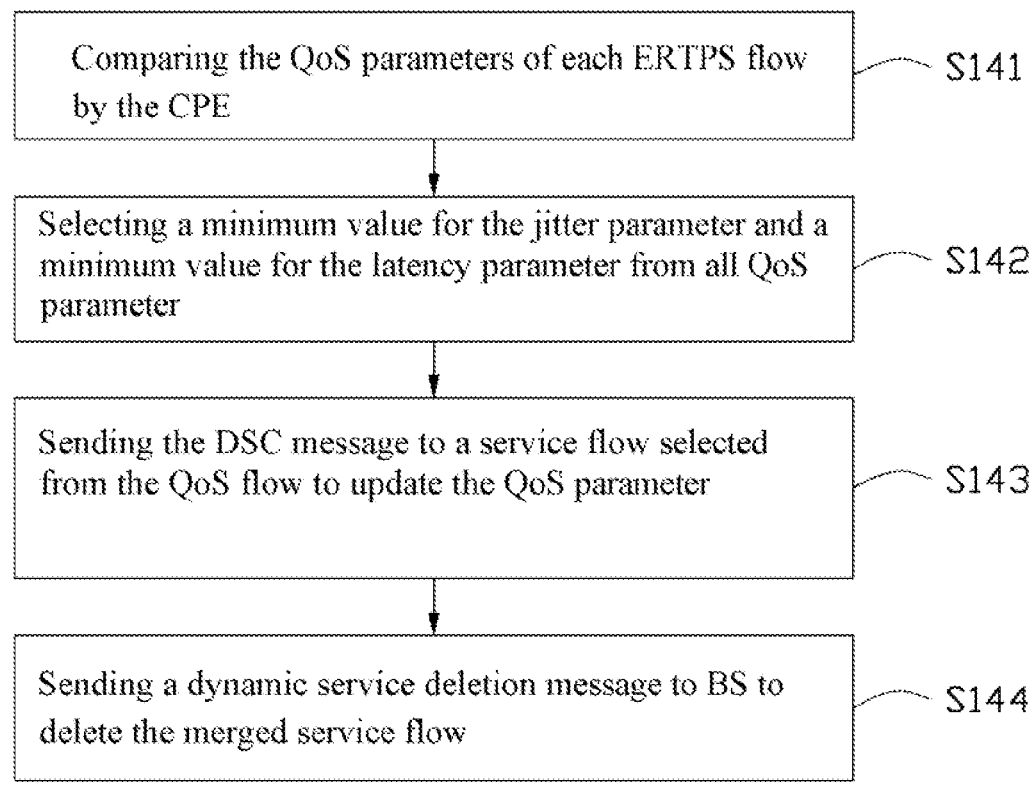
FIG. 4 is a flowchart of one embodiment of the step S14 of the disclosure.

Also referring to FIGS. 3 and 4, a selection method for automatically selecting either the OFOC mode or the OFAC mode as the QoS flow according to one embodiment of the disclosure, is depicted. The selection method can use the aforementioned selection system 100, and may include at least the following steps.

In step S1, the signal processing unit 122 of the CPE 12 searches and obtains the WIMAX channels available within an operating frequency bands (e.g., 2.3 GHz or 2.5 GHz), and lists the WIMAX channels based on the CINR in order, such as an ascending order or a descending order, to choose an optimal WIMAX channel over which communication can be established with the BS 11.

In step S2, the CPE 12 exchanges authentication information with the EMS 13 through the BS 11 and the Internet, and downloads the bootstrap program from the EMS 13 to communicate with the EMS 13.

In step S3, the signal transceiver unit 126 of the CPE 12 transmits the preset request information to the EMS 13 via the BS 11 and the Internet, to determine the MSR of the ERTPS flow of the BS 11.

In step S4, the signal processing unit 122 calculates the maximum bandwidth according to the MSR for communication between the CPE 12 and the BS 11.

In step S5, the signal processing unit 122 determines whether or not the MSR of the ERTPS flow enables support for multiway calls between the CPE 12 and EMS 13. If the MSR enables the multiway calls between the CPE 12 and EMS 13, then the method proceeds to step S6; otherwise, the method proceeds to step S7.

In step S6, the signal transceiver unit 126 of the CPE 12 resends the preset request information to the EMS 13 through the BS 11 and the Internet to obtain the load values of the BS 11.

In step S7, the signal processing unit 122 creates a new QoS flow, and the new QoS flow is set to the OFOC mode to ensure that each call has its own QoS flow, and the method ends.

In step S8, the EMS 13 receives the reset request information from the CPE 12, and transmits the enquiry, corresponding to the request for information, to the BS 11 to obtain the load values of the BS 11.

In step S9, the BS 11 receives and processes the enquiry from the EMS 13, and delivers the feedback results to the EMS 13.

In step S10, the EMS 13 transmits the feedback results including the load values of the BS 11 to the signal transceiver unit 126, and the feedback results are stored in the storage unit 24 of the CPE 12.

In step S11, the signal processing unit 22 determines whether the load values of the BS 11 are above or below the predetermined threshold value of the BS 11. If the load values exceed the preset threshold value, then the method proceeds to step S12; if the load values are below the predetermined threshold value, then the method proceeds to step S7.

In step S12, since the MSR of the ERTPS flow supports multiway calls, and the load values of the BS 11 exceed the preset threshold value, the signal processing unit 122 determines whether the QoS flow is in the OFOC mode or not. If the QoS flow is not in the OFOC mode, then the method proceeds to step S13; if the QoS flow is in the OFOC mode, then the method proceeds to step S14.

In step S13, the signal transceiver unit 126 sends dynamic service change (DSC) messages to the BS 11 to change the service flows and update the bandwidth of the BS 11 for all subsequent calls, and the method ends.

In step S14, the signal processing unit 122 merges and combines the current ERTPS flow into a new service flow and converts the QoS flow to the OFAC mode, and synchronizes the QoS parameters to save system resources, and the method ends.

Further referring to FIG. 5, the step S14 may include at least the following sub-steps.

In step S141, the signal processing unit 122 of the CPE 12 compares the QoS parameters of each ERTPS flow.

In step S142, the signal processing unit 122 selects a minimum value for the jitter parameter and a minimum value for the latency parameter from all the QoS parameters.

In step S143, the signal processing unit 122 selects a service flow from the QoS flows and sends the DSC message to the BS 11 to update and change the bandwidth, the convergence service and the QoS parameters for the other merged service flows.

In step S144, the signal transceiver unit 126 sends a dynamic service deletion (DSD) message to the BS 11 to delete the merged service flow.

In summary, in the selection system 100 of this disclosure, the selection system 100 can calculate the MSR of the ERTPS flow of the BS 11 in real-time to automatically select the flow mode (i.e. either the OFOC mode or the OFAC mode). The selection system 100 can also dynamically choose an appropriate flow mode in real-time according to the load parameters of the BS 11, which can improve the compatibility and application of the selection system 100.

In the present specification and claims, the word "a" or "an" preceding an element does not exclude the presence of a plurality of such elements. Further, the word "comprising" does not exclude the presence of other elements or steps than those listed.

It is to be understood, however, that even though numerous characteristics and advantages of the exemplary disclosure have been set forth in the foregoing description, together with details of the structure and function of the exemplary disclosure, the disclosure is illustrative only, and changes may be made in detail, especially in the matters of shape, size, and arrangement of parts within the principles of exemplary disclosure to the full extent indicated by the broad general meaning of the terms in which the appended claims are expressed.

What is claimed is:

1. A customer-promises equipment (CPE) in electronic communication with an element management system (EMS) through a base station (BS), the CPE comprising:

a signal transceiver unit that transmits predetermined request information to the EMS through the BS; and a signal processing unit electrically connected to the signal transceiver unit, the signal processing unit configured for determining a maximum sustained rate (MSR) of an extended real-time polling service (ERTPS) flow of the BS according to the request information, wherein the signal processing unit determines whether or not the MSR of the ERTPS flow enables support for multiway calls between the CPE and the EMS, and in response to the MSR of the ERTPS flow is unable to support for multiway calls, the signal processing unit creates a quality of service (QoS) flow, and the QoS flow is set to an one flow one call (OFOC) mode; in response to the MSR of the ERTPS flow enables the multiway calls, the signal processing unit obtains load values of the BS, and compares the obtained load values with a predetermined threshold value of the BS, and sets the QoS flow to the OFOC mode if the obtained load value is below the threshold value of the BS; if the obtained load value exceeds the threshold value of the BS, the signal processing unit enables and sets the QoS flow to a one flow all call (OFAC) mode.

2. The CPE as claimed in claim 1, wherein the CPE further comprising a storage unit electrically connected to the signal processing unit, the storage unit is a programmable read-only memory or a flash memory.

3. The CPE as claimed in claim 1, wherein the signal processing unit searches and obtains worldwide interoperability for microwave access (WIMAX) channels in the operating frequency bands of the CPE, and sorts the WIMAX channels based on the carrier to interference plus noise ratio (CINR) to choose an optimal WIMAX channel and establish communication with the BS.

4. The CPE as claimed in claim 1, wherein the CPE exchanges authentication information with the EMS through the BS and downloads a bootstrap program from the EMS to communicate with the EMS, and the signal transceiver unit transmits the preset request information to the EMS via the BS to obtain the MSR of the ERTPS flow.

5. The CPE as claimed in claim 4, wherein the signal processing unit calculates the maximum bandwidth according to the MSR of the ERTPS flow for the communications between the CPE and the BS.

6. The CPE as claimed in claim 5, wherein the EMS receives the reset request information from the CPE and transmits enquiry corresponding to the request information to the BS to obtain the load values of the BS, the BS processes the enquiry from the EMS and delivers corresponding feedback results to the EMS, and the EMS transmits the feedback results to the signal transceiver unit.

7. The CPE as claimed in claim 6, wherein the signal processing unit determines whether the QoS flow is in the OFOC mode or not when the load values of the BS exceed the preset threshold value.

8. The CPE as claimed in claim 7, wherein the signal transceiver unit sends a dynamic service change (DSC) message to the BS to change the QoS flows and update the bandwidth of the BS for following calls if the QoS flow is not in the OFOC mode; the signal processing unit merges the ERTPS flow into a new QoS flow and converts the QoS flow into the OFAC mode, and synchronizes the QoS parameters if the QoS flow is in the OFOC mode.

9. The CPE as claimed in claim 8, wherein the signal processing unit compares the QoS parameters of each ERTPS flow selects a minimum value of jitter and latency parameter from all QoS parameters, and selects a flow from the QoS flows and sends the DSC message to the BS to update the QoS parameters for the other merged service flows, and sends a dynamic service deletion message to the BS to delete the merged service flow.

10. A selection method for allowing a customer-promises equipment (CPE) to selecting quality of service (QoS) flow modes, the selection method comprising steps of:
transmitting a predetermined request information to an element management system (EMS) via a base station (BS) by the CPE to determine a maximum sustained rate (MSR) of an extended real-time polling service (ERTPS) flow;
determining a maximum bandwidth according to the MSR by a signal processing unit of the CPE;
determining whether or not the MSR of the ERTPS flow enables to support for multiway calls between the CPE and the EMS by the signal processing unit;
creating a first QoS flow that is set to an one flow one call (OFOC) mode when the MSR is unable to support for the multiway calls by the signal processing unit;
comparing load values of the BS with a predetermined threshold value by the signal processing unit of the CPE; and
enabling the QoS flow to the OFOC mode or a one flow all call (OFAC) mode according to the comparison by the signal processing unit.

11. The selection method as claimed in claim 10, further comprising searching and sorting worldwide interoperability for microwave access (WIMAX) channels in operating frequency bands to choose an optimal WIMAX channel and communicate with the BS by the signal processing unit.

12. The selection method as claimed in claim 10, further comprising exchanging authentication information with the EMS via the BS to download a bootstrap program by the CPE.

13. The selection method as claimed in claim 10, further comprising resending the preset request information to the EMS through the BS to obtain the load values of the BS by a signal transceiver of the CPE if the MSR enables support for the multiway calls between the CPE and the EMS.

14. The selection method as claimed in claim 13, further comprising receiving the request information from the CPE and transmitting enquiry corresponding to the request information to the BS to get the load values of the BS by the EMS.

15. The selection method as claimed in claim 14, further comprising processing the enquiry by the BS and delivering corresponding results to the EMS by the BS.

16. The selection method as claimed in claim 15, further comprising transmitting the results by the EMS to the CPE.

17. The selection method as claimed in claim 14, further comprising determining whether the QoS flow is in the OFOC mode or not by the signal processing unit of the CPE if the load values exceed the preset threshold value.

18. The selection method as claimed in claim 17, further comprising sending a dynamic service change (DSC) message to the BS to update the bandwidth of the BS by the signal transceiver of the CPE if the load values are below the predetermined threshold value.

19. The selection method as claimed in claim 18, further comprising merging the ERTPS flow into a new QoS flow that is set to the OFAC mode and supports multiway calls by the signal processing unit of the CPE.

20. The selection method as claimed in claim 19, wherein the step merging the ERTPS flow into a new QoS flow that is set to the OFAC mode and supports multiway calls by the signal processing unit of the CPE comprising sub-steps of:
comparing the QoS parameters of each ERTPS flow by the signal processing unit;
selecting a minimum value of jitter parameter and latency parameter from all QoS parameter by the signal processing unit;
sending the DSC message to a flow selected from the QoS flow to update the QoS parameter by the signal processing unit; and sending a dynamic service deletion message to BS to delete the merged service flow by the transceiver unit.

* * * * *